(12) United States Patent
Wible et al.

(10) Patent No.: US 9,916,555 B2
(45) Date of Patent: Mar. 13, 2018

(54) LOCATION TRACKING WITH INTEGRATED IDENTIFICATION OF CARGO CARRIER CONTENTS AND RELATED SYSTEM AND METHOD

(75) Inventors: Jason A. Wible, Plano, TX (US); Brandon C. Taylor, Frisco, TX (US); James S. MacLean, III, Coppell, TX (US)

(73) Assignee: Geoforce, Inc., Lewisville, TX (US)

( * ) Notice: Subject to any disclaimer, the term of this patent is extended or adjusted under 35 U.S.C. 154(b) by 207 days.

(21) Appl. No.: 13/443,841

(22) Filed: Apr. 10, 2012

(65) Prior Publication Data

US 2013/0265155 A1 Oct. 10, 2013

(51) Int. Cl.
| | | |
|---|---|---|
| G08B 1/08 | (2006.01) | |
| G06Q 10/08 | (2012.01) | |
| G06Q 50/28 | (2012.01) | |
| G06K 19/07 | (2006.01) | |
| G06K 17/00 | (2006.01) | |

(52) U.S. Cl.
CPC ............ *G06Q 10/08* (2013.01); *G06Q 50/28* (2013.01); *G06K 19/0717* (2013.01); *G06K 19/0723* (2013.01); *G06K 2017/0045* (2013.01); *G06Q 10/087* (2013.01); *G06Q 10/0833* (2013.01)

(58) Field of Classification Search
CPC .. G06Q 10/08; G06Q 10/087; G06Q 10/0833; G06Q 50/28; G06K 19/0717; G06K 19/0723; G06K 2017/0045
USPC .................................. 340/539.13, 573.1, 8.1
See application file for complete search history.

(56) References Cited

U.S. PATENT DOCUMENTS

| | | | |
|---|---|---|---|
| 3,573,817 A | 4/1971 | Akers | |
| 4,977,577 A | 12/1990 | Arthur et al. | |
| 5,151,684 A * | 9/1992 | Johnsen | 340/568.1 |
| 5,380,994 A | 1/1995 | Ray | |
| 5,386,084 A | 1/1995 | Risko | |
| 5,479,441 A | 12/1995 | Tymes et al. | |
| 5,668,803 A | 9/1997 | Tymes et al. | |
| 5,686,888 A * | 11/1997 | Welles et al. | 340/539.13 |
| 5,774,876 A * | 6/1998 | Woolley et al. | 705/28 |
| 5,835,377 A | 11/1998 | Bush | |

(Continued)

FOREIGN PATENT DOCUMENTS

WO   WO 2011038018 A1 * 3/2011

OTHER PUBLICATIONS

"Globalstar MMT Wireless Tracker", www.globalstar.com, 2010, 1 page.

(Continued)

*Primary Examiner* — Firmin Backer
*Assistant Examiner* — Adnan Aziz

(57) ABSTRACT

Various methods and devices are provided for integrating location tracking and cargo identification. For example, an identification of a cargo carrier can be provided, such as by an identification or tracking device associated with the cargo carrier. Also, an identification of a carried asset can be provided, such as by a tag or optical code associated with the carried asset. Further, a determination can be made whether the carried asset is being added to or removed from the cargo carrier. This could be done automatically or based on user input. This information can be collected and stored in association with each other so that location information about the carried asset can be provided to users.

20 Claims, 11 Drawing Sheets

(56) References Cited

U.S. PATENT DOCUMENTS

| | | |
|---|---|---|
| 5,920,589 A | 7/1999 | Rouquette et al. |
| 5,987,058 A | 11/1999 | Sanderford et al. |
| 5,999,561 A | 12/1999 | Naden et al. |
| 6,216,087 B1 | 4/2001 | Want et al. |
| 6,292,108 B1 | 9/2001 | Straser et al. |
| 6,639,939 B1 | 10/2003 | Naden et al. |
| 6,830,181 B1 | 12/2004 | Bennett |
| 6,847,892 B2 | 1/2005 | Zhou et al. |
| 6,851,611 B1 | 2/2005 | Shaw-Sinclair |
| 6,965,314 B2 | 11/2005 | Bohinc, Jr. |
| 6,974,078 B1 | 12/2005 | Simon |
| 7,009,530 B2 | 3/2006 | Zigdon et al. |
| 7,040,532 B1 | 5/2006 | Taylor et al. |
| 7,072,320 B2 | 7/2006 | Filho |
| 7,098,784 B2 | 8/2006 | Easley et al. |
| 7,099,770 B2 | 8/2006 | Naden et al. |
| 7,109,265 B2 | 9/2006 | Kucera et al. |
| 7,187,278 B2 | 3/2007 | Biffar |
| 7,262,685 B2 | 8/2007 | Bastian, II |
| 7,315,281 B2 | 1/2008 | Dejanovic et al. |
| 7,327,262 B2 | 2/2008 | Motteram et al. |
| 7,337,061 B2 | 2/2008 | Naden et al. |
| 7,384,380 B2 | 6/2008 | Reinbond et al. |
| 7,405,655 B2 | 7/2008 | Ng et al. |
| 7,477,694 B2 | 1/2009 | Sanderford, Jr. et al. |
| 7,558,312 B2 | 7/2009 | Cheng et al. |
| 7,593,456 B2 | 9/2009 | Sailaja et al. |
| 7,620,098 B2 | 11/2009 | Hong et al. |
| 7,623,029 B2* | 11/2009 | Meyers ............ 340/539.13 |
| 7,672,781 B2 | 3/2010 | Churchill et al. |
| 7,683,270 B2 | 3/2010 | Fernandez et al. |
| 7,693,530 B1 | 4/2010 | McKinney et al. |
| 7,705,777 B2 | 4/2010 | Sanderford, Jr. et al. |
| 7,895,131 B2* | 2/2011 | Kraft ............ 705/333 |
| 7,928,844 B2 | 4/2011 | Mackenzie et al. |
| 7,932,827 B2 | 4/2011 | Chand et al. |
| 7,978,065 B2* | 7/2011 | Schnitz et al. ............ 340/539.13 |
| 7,994,917 B2 | 8/2011 | Hirota et al. |
| 8,004,387 B2* | 8/2011 | Childress et al. ............ 340/5.92 |
| 8,004,397 B2* | 8/2011 | Forrest et al. ............ 340/539.1 |
| 8,014,439 B2 | 9/2011 | Sakamoto et al. |
| 8,126,680 B2* | 2/2012 | Troxler et al. ............ 702/187 |
| 8,159,329 B1 | 4/2012 | Killian et al. |
| 8,223,009 B2* | 7/2012 | Anderson et al. ............ 340/539.1 |
| 8,237,575 B2 | 8/2012 | MacLean, III et al. |
| 8,239,169 B2 | 8/2012 | Gregory et al. |
| 8,837,447 B2* | 9/2014 | Twitchell, Jr. ............ 370/338 |
| 2002/0038267 A1* | 3/2002 | Can et al. ............ 705/28 |
| 2003/0087631 A1 | 5/2003 | Diachina et al. |
| 2003/0149526 A1 | 8/2003 | Zhou et al. |
| 2004/0124977 A1* | 7/2004 | Biffar ............ 340/539.13 |
| 2004/0147220 A1 | 7/2004 | Vaddiparty et al. |
| 2004/0157597 A1 | 8/2004 | Comer et al. |
| 2004/0212499 A1* | 10/2004 | Bohinc, Jr. ............ 340/539.29 |
| 2005/0113107 A1 | 5/2005 | Meunier |
| 2005/0140498 A1 | 6/2005 | Bastian, II |
| 2005/0171696 A1 | 8/2005 | Naden et al. |
| 2005/0250440 A1 | 11/2005 | Zhou et al. |
| 2006/0007006 A1 | 1/2006 | Alioto et al. |
| 2006/0011716 A1 | 1/2006 | Perkowski |
| 2006/0059964 A1 | 3/2006 | Bass et al. |
| 2006/0109106 A1* | 5/2006 | Braun ............ G06Q 10/08 340/539.13 |
| 2006/0113370 A1 | 6/2006 | Taylor et al. |
| 2006/0113374 A1 | 6/2006 | Taylor et al. |
| 2006/0221363 A1 | 10/2006 | Roth et al. |
| 2007/0222595 A1 | 9/2007 | Motteram et al. |
| 2008/0001748 A1* | 1/2008 | Childress et al. ............ 340/572.1 |
| 2008/0030330 A1 | 2/2008 | Vock et al. |
| 2008/0042842 A1* | 2/2008 | Ulibarri ............ 340/572.1 |
| 2008/0051033 A1 | 2/2008 | Hymes |
| 2008/0186166 A1 | 8/2008 | Zhou et al. |
| 2008/0198905 A1 | 8/2008 | Zhu et al. |
| 2008/0221930 A1 | 9/2008 | Wekell et al. |
| 2008/0266131 A1 | 10/2008 | Richardson et al. |
| 2009/0051490 A1* | 2/2009 | Childress et al. ............ 340/5.92 |
| 2009/0109040 A1 | 4/2009 | MacLean, III et al. |
| 2009/0117880 A1 | 5/2009 | Sipher |
| 2009/0322510 A1* | 12/2009 | Berger et al. ............ 340/539.1 |
| 2010/0016022 A1 | 1/2010 | Liu et al. |
| 2010/0038417 A1 | 2/2010 | Blankitny |
| 2010/0137148 A1 | 6/2010 | Kaye |
| 2010/0151955 A1 | 6/2010 | Holden |
| 2010/0171611 A1 | 7/2010 | Gao et al. |
| 2010/0224783 A1 | 9/2010 | Frank |
| 2010/0258618 A1 | 10/2010 | Philbrick et al. |
| 2010/0312833 A1 | 12/2010 | Rimmer et al. |
| 2010/0314456 A1 | 12/2010 | Hartwig et al. |
| 2010/0325101 A1* | 12/2010 | Beal ............ G06Q 30/02 707/707 |
| 2011/0004444 A1 | 1/2011 | Farrow et al. |
| 2011/0017693 A1 | 1/2011 | Thomas et al. |
| 2011/0018418 A1 | 1/2011 | Yoo |
| 2011/0050424 A1* | 3/2011 | Cova et al. ............ 340/572.1 |
| 2011/0066398 A1* | 3/2011 | Troxler et al. ............ 702/150 |
| 2011/0074629 A1 | 3/2011 | Khan et al. |
| 2011/0079652 A1 | 4/2011 | Bass et al. |
| 2011/0112979 A1 | 5/2011 | Holsen et al. |
| 2011/0155920 A1 | 6/2011 | Hupont et al. |
| 2012/0037697 A1 | 2/2012 | Boone et al. |
| 2012/0084182 A1 | 4/2012 | Bass et al. |
| 2012/0087355 A1 | 4/2012 | Wentink |

OTHER PUBLICATIONS

"Globalstar Smarttone Satellite Managed Asset Ready Tracker", www.globalstar.com, 2010, 1 page.

"SmartOne LP, Satellite-Manged Asset-Ready Tracker", www.globalstar.com, 2011, 2 pages.

Brandon C. Taylor, et al., "System and Method for Remote Cargo Tracking", U.S. Appl. No. 13/443,201, filed Apr. 10, 2012.

Jason A. Wible, et al., "Apparatus and Method for Radio Frequency Silencing in Oil and Gas Operations, Excavation Sites, and Other Environments", U.S. Appl. No. 13/443,097, filed Apr. 10, 2012.

Brandon C. Taylor, et al., "System and Method for Remote Equipment Data Management", U.S. Appl. No. 13/443,118, filed Apr. 10, 2012.

Office Action dated Sep. 6, 2013 in connection with U.S. Appl. No. 13/443,118.

U.S. Office Action dated Apr. 24, 2014 in connection with U.S. Appl. No. 13/443,097; 21 pages.

U.S. Office Action dated Mar. 26, 2014 in connection with U.S. Appl. No. 13/443,118; 17 pages.

Office Action dated Jul. 18, 2014 in connection with U.S. Appl. No. 13/443,118, 17 pages.

Office Action dated Aug. 5, 2014 in conneciton with U.S. Appl. No. 13/443,097, 18 pages.

Office Action dated Oct. 6, 2010 in connection with U.S. Appl. No. 12/288,909.

Office Action dated Feb. 7, 2011 in connection with U.S. Appl. No. 12/288,909.

Office Action dated Jun. 10, 2011 in connection with U.S. Appl. No. 12/288,909.

Office Action dated Sep. 20, 2012 in connection with U.S. Appl. No. 13/479,005.

Office Action dated Oct. 26, 2012 in connection with U.S. Appl. No. 13/443,097.

Office Action dated Mar. 7, 2013 in connection with U.S. Appl. No. 13/479,005.

Office Action dated Apr. 12, 2013 in connection with U.S. Appl. No. 13/443,097.

Office Action dated Sep. 20, 2013 in connection with U.S. Appl. No. 13/443,819.

Office Action dated Nov. 20, 2013 in connection with U.S. Appl. No. 13/443,097.

Office Action dated Jan. 30, 2014 in connection with U.S. Appl. No. 13/443,819.

Office Action dated May 28, 2014 in connection with U.S. Appl. No. 13/443,819.

(56) References Cited

OTHER PUBLICATIONS

Office Action dated Oct. 1, 2014 in connection with U.S. Appl. No. 13/443,819, 23 pages.
U.S. Office Action dated Jan. 23, 2015 in connection with U.S. Appl. No. 13/443,201; 21 pp.
U.S. Notice of Allowance dated Mar. 5, 2015 in connection with U.S. Appl. No. 13/443,118; 20 pp.
U.S. Notice of Allowance dated Feb. 4, 2015 in connection with U.S. Appl. No. 13/443,097; 14 pp.
Office Action dated Aug. 20, 2015 in connection with U.S. Appl. No. 13/443,201. 15 pages.
U.S. Office Action issued for U.S. Appl. No. 14/662,797 dated May 10, 2016, 33 pgs.

* cited by examiner

VIEW OF ASSETS

MAP | LOCATION | LIST

SEARCH ASSETS

Basket

SHARED ASSETS

Select shared Account...

ASSET FILTERS — SHOW ADVANCED

| | |
|---|---|
| All | 4037 |
| Not Tagged | 2455 |
| Not Flagged | 0 |
| Flagged: GREEN | 1752 |
| Flagged: YELLOW | 54 |
| Flagged: RED | 1 |
| Flagged: BLACK | 0 |
| Recently Notified | 293 |
| Gator CCU | 2030 |

LIST VIEW: *Gator Tank Rentals, LLC.*

ADMIN TOOLS | SHARE ASSETS | | | | GROUP ASSET | | | | CLOSE ADMIN | EXPORT

Select: This Page, All Pages, None

| | ASSET NAME ▼ | Owner | Asset Description | Number | On Rent | Days |
|---|---|---|---|---|---|---|
| | | Chevron | Mud Motor | 123465 | 30-Jan-10 | 95 |
| | | Morgan City Rentals | | 654654 | 15-Feb-10 | 5 |
| | | Schlumberger | LWD Tools (various) | unknown | 1-Apr-10 | 13 |
| | | Franks Casing | Big Stuff | 1234 (I think) | 1-Apr-10 | 4 |
| ☐ | 4 x 8 x 3 Material Basket w/ Slings | MB-288 | LA 70380, USA - about 21 hours ago | | Gator Tank Rentals, Inc. | |
| ☐ | 4 x 8 x 3 Material Basket w/ Slings | MB-321 | 9040-9288 LA-182, Morgan City, LA 70380, USA - about 22 hours ago | | Gator Tank Rentals, Inc. | |
| ☐ | 4 x 8 x 3 Material Basket w/ Slings (BP*) | MB-094 | GC 787 (Lat:27.195528 Lon:-90.026649) - about 21 hours ago | | | |
| ☐ | 4 x 8 x 3 Material Basket w/ Slings | MB-097 | 9040-9288 LA-182, Morgan City, LA 70380, USA - about 21 hours ago | | Gator Tank Rentals, Inc. | |
| ☐ | 4 x 8 x 3 Material Basket w/ Slings | MB-103 | 9040-9288 LA-182, Morgan City, LA 70380, USA - about 21 hours ago | | Gator Tank Rentals, Inc. | |
| ☐ | 4 x 8 x 3 Material Basket w/ Slings (WILDWELL*) | MB-212 | GI 47 (Lat:28.969015 Lon:-90.021629) - 6 days ago | | | |
| ☐ | 4 x 8 x 3 Material Basket w/ Slings | MB-225 | GC 743 (Lat:27.224851 Lon:-90.032356) - about 21 hours ago | | | |

*FIG. 13*

◀ 4 x 8 Basket: GB-127                                           🖉 ADD  ✏ EDIT  🖨 PRINT

CHANGE VIEW
MAP  LOCATION  LIST

ASSET DESCRIPTION
Tare Weight: 10,450 lbs
Safe Working Load: 4,550 lbs
Max Gross Weight: 15,000 lbs
L x W x H: 183" x 95" x 115"

LATEST INFORMATION
Last Seen: WR 499 (Lat:26.441153 Lon:-91.190147) - 7 minutes ago
Location Name:
Last Status: OUT - 7 days ▼ Basket Contents                                            ⟳ New Item

| Owner | Asset Description | Serial # | On Rent | Days |
|---|---|---|---|---|
| Chevron | Mud Motor | 123465 | 30-Jan-10 | 95 |
| Morgan City Rentals | | 654654 | 15-Feb-10 | 5 |
| Schlumberger | LWD Tools (various) | unknown | 1-Apr-10 | 13 |
| Franks Casing | Big Stuff | 1234 (I think) | 1-Apr-10 | 4 |

▼ LIFT COMPLIANCE DATA

GREEN: Due in > 42 days from today     YELLOW: Due 14-42 days from today     RED: Due in < 14 days from today PORTABLE MAXIS UNIT                                                                   [BACK FLAG THIS ABUTT]

| TASK DESCRIPTION | COMPLETED | BY | VALIDITY | DUE | DOCUMENTATION |
|---|---|---|---|---|---|
| Visual Inspection (EDIT) | 05-Jan-2010 | Kateria Gunner | 6 Months | 05-Jul-2010 | OTIC-02_2010-01-06.PDF (EDIT) |
| Non-Destructive Test (NDT) (EDIT) | 28-Jul-2009 | Kateria Gunner | 1 Year | 28-Jul-2010 | OTIC-02_2010-01-06.PDF (EDIT) |
| Load Test (EDIT) | 16-Oct-2008 | Kateria Gunner | 2 Years | 16-Oct-2010 | OTIC-02_2010-01-06.PDF (EDIT) |
| Engineering Drawings (EDIT) | | | Permanent | Permanent | OTIC_02.pdf |
| Shell Certification (EDIT) | 26-Feb-2008 | Chris Tevis | Permanent | Permanent | SEPCO_OTIC-02_26-02-2008.pdf |
| BHP Compliant (EDIT) | 16-Oct-2008 | Chris Tevis | Permanent | Permanent | |

*FIG. 14*

LOCATION TRACKING WITH INTEGRATED IDENTIFICATION OF CARGO CARRIER CONTENTS AND RELATED SYSTEM AND METHOD

TECHNICAL FIELD

This disclosure relates generally to asset tracking systems. More specifically, this disclosure relates to location tracking with integrated identification of cargo carrier contents and related system and method.

BACKGROUND

Many exploration and production operations, such as oil and gas operations, are supplied by supply chains that use various types of containers like tanks, boxes, and pallets. Many of these containers are tracked at certain points along a supply chain. However, full visibility into a supply chain is often limited. For example, a supply inventory in a container is often unknown. These supplies vary from "rope, soap and dope" (which may be tracked for manifesting purposes) to valuable drilling equipment, such as downhole tools, drilling collars, formation evaluation tools, and core samples. Some containers may also include hazardous materials or other materials that have regulatory requirements.

SUMMARY

This disclosure provides location tracking with integrated identification of cargo carrier contents and related system and method.

In a first embodiment, a method includes receiving, at a portable device associated with a user, an identification of a cargo carrier from an identification device associated with the cargo carrier. The method also includes identifying, at the portable device, an asset being added to or removed from the cargo carrier. The method further includes generating, at the portable device, one or more messages identifying the cargo carrier and the asset and indicating whether the asset is being added to or removed from the cargo carrier. In addition, the method includes transmitting, from the portable device, the one or more messages.

In a second embodiment, a method includes identifying, at a location tracking device associated with a cargo carrier, a location of the location tracking device. The method also includes receiving, at the location tracking device, information identifying one or more carried assets in or on the cargo carrier. The method further includes generating, at the location tracking device, one or more messages identifying the location of the location tracking device and the one or more carried assets in or on the cargo carrier. In addition, the method includes transmitting, from the location tracking device, the one or more messages.

In a third embodiment, a method includes receiving information identifying a location associated with a cargo carrier and receiving information identifying one or more carried assets in or on the cargo carrier. The method also includes storing the information identifying the location of the cargo carrier in association with the information identifying the one or more carried assets in or on the cargo carrier. The method further includes updating the location of the cargo carrier to track the location of the one or more carried assets.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The term "transceiver" includes a transmitter, a receiver, or a combination of a transmitter and a receiver. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of this disclosure, reference is now made to the following description, taken in conjunction with the accompanying drawings, in which:

FIGS. 12 through 14 illustrate example graphical user interfaces showing integrated location tracking and identification of cargo carrier contents according to this disclosure.

DETAILED DESCRIPTION

FIGS. 1 through 14, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
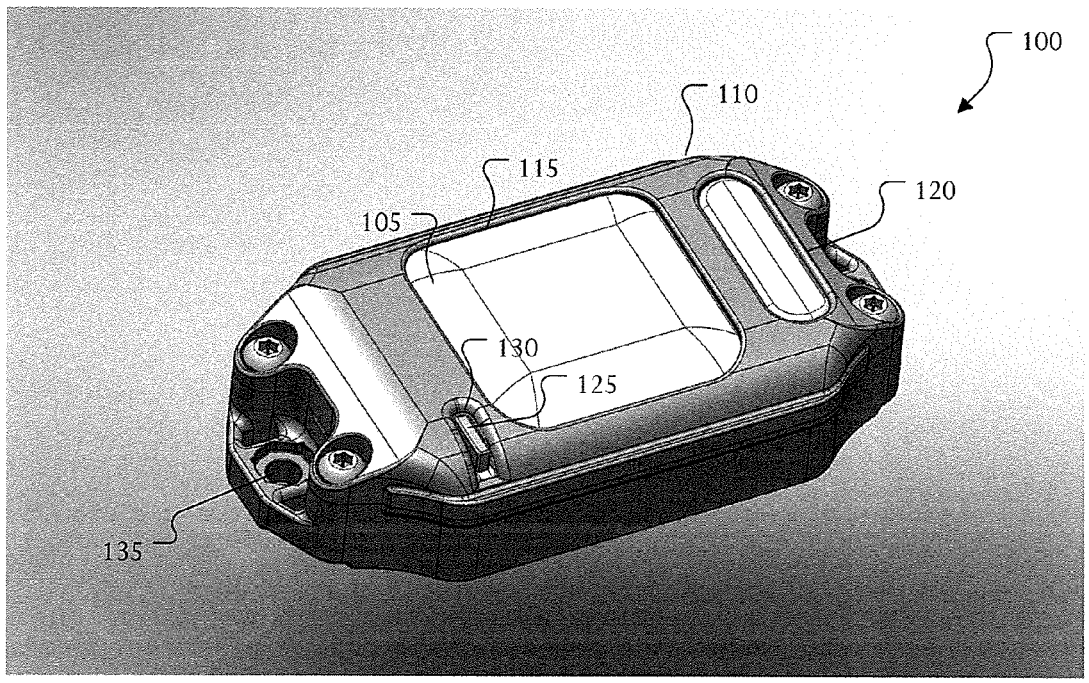
FIG. 1 illustrates an example global tracking device according to this disclosure.

FIG. 1 illustrates an example global tracking device (GTD) 100 according to this disclosure. As shown in FIG. 1, the GTD 100 includes a control unit 105 and a hardened case 110. The hardened case 110 is configured to protect the control unit 105 during deployment in the field. The hardened case 110 can be formed from any suitable material(s), such as a zinc alloy, steel, or other suitable material. In some embodiments, the material used to form the hardened case 110 is anti-magnetic and/or non-sparking. The hardened case 110 inhibits damage to the control unit 105, such as by helping to prevent damage from compression, impact, and weather. As a specific example, the hardened case 110 can prevent water or other liquids from contacting or entering into the control unit 105. In some embodiments, the GTD 100 includes at least two layers of seals configured to protect processing circuitry and a power source contained within the control unit 105.

In this example, the hardened case 110 includes a first window 115 configured to allow transmission of wireless signals to and from the control unit 105. The wireless signals can include long-range RF signals, such as cellular wireless signals or satellite communication signals. The first window 115 is also configured to protect the control unit 105 from electro-static interference (ESI). In this example, the first window 115 is dimensioned to enable part of the control unit 105 to extend into the first window 115. In some embodiments, the portion of the control unit 105 that extends into the first window 115 can extend beyond a planar level of a surface of the hardened case 110. In addition, the first window 115 can be dimensioned to help focus wireless signals towards a transceiver in the control unit 105. For example, the first window 115 can be dimensioned so that a metal edge of the first window 115 is disposed at a specified angle in relation to a location of the transceiver. In some embodiments, the metal edge of the first window 115 is disposed at an angle of about 28° from the transceiver.

The hardened case 110 also includes a second window 120 configured to allow transmission of local wireless signals to and from the control unit 105. The local wireless signals can include BLUETOOTH LOW ENERGY (BLE), WiFi, ZIGBEE, Radio Frequency identification (RFID), or other signals. The second window 120 also protects the control unit 105 from ESI. In this example, the second window 120 is dimensioned to enable part of the control unit 105 to extend into the second window 120. In some embodiments, the portion of the control unit 105 that extends into the second window 120 can extend beyond a planar level of a surface of the hardened case 110.

The GTD 100 further includes a switch 125 that enables an operator to activate or deactivate the GTD 100. The switch 125 here extends through a third window 130 in the hardened case 110. The switch 125 can be coupled to the processing circuitry or other components within the control unit 105. The switch 125 represents any suitable type of switch, such as a magnetic switch.

The GTD 100 is adapted to be removably mounted to a container or other structure. For example, the GTD 100 can include a mounting mechanism for attaching the GTD 100 to a number of different types of containers, tools, equipment, or machinery. For example, the GTD 100 can be mounted using one or more hex-head screws, socket-head cap screws, hex-head self-tapping screws, Phillips-head self tapping screws, stainless steel banding straps, zip-ties, VHB tape, and/or magnetic mountings. As a particular example, the hardened case 110 can include a number of openings 135 configured to receive screws, such as hex-head screws or socket-head cap screws. The GTD 100 can also be mounted via a standard mounting, a flush mounting, or some other mounting technique. In general, the GTD 100 can be mounted on or to any suitable "cargo carrier," which refers to any structure configured to carry or store one or more products or other materials. A cargo carrier could represent a pallet, tank, box, or any other suitable container or other carrier.

Figure 2:
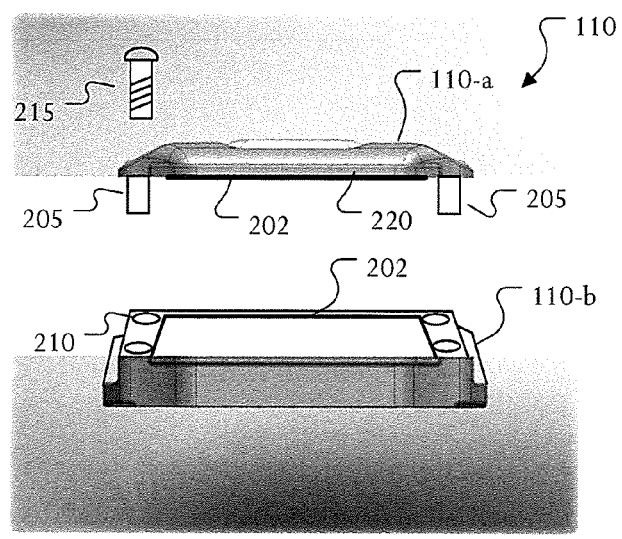
FIG. 2 illustrates an example hardened case for a global tracking device according to this disclosure.

FIG. 2 illustrates an example hardened case 110 for a global tracking device 100 according to this disclosure. As shown in FIG. 2, the hardened case 110 is configured to protect processing circuitry in the control unit 105 and a power source for the processing circuitry. In some embodiments, the hardened case 110 and the processing circuitry in the control unit 105 can be configured to have a limited lump capacitance. Also, in some embodiments, the hardened case 110 is configured to be certified for powered devices operating within explosive environments. Example certifications could include European ATEX and/or International Electrotechnical (IEC-W0029-0).

In the example shown in FIG. 2, the hardened case 110 has a modular construction. The hardened case 110 here includes a top portion 110-*a* and a bottom portion 110-*b*. When coupled together, the top portion 110-*a* and the bottom portion 110-*b* are configured to form a water-tight seal around the control unit 105. For example, the top portion 110-*a* and the bottom portion 110-*b* can include interlaced gaskets 202 each having multiple ridges configured to interlace with each other to form the water-tight seal. The gaskets 202 can include any suitable material(s) for forming a seal. The gaskets 202 could, for instance, be formed of a fluorosilicone material or other material(s) resistant to and providing a water-tight seal across a wide temperature range, such as from a low temperature of −40° C. to a high temperature of 85° C. The gaskets 202 can further be configured to absorb changes in section of metal or plastic.

In this example, the top portion 110-*a* also includes multiple support dowels 205, and the bottom portion 110-*b* also includes multiple vias 210. Each via 210 is adapted to receive and couple with a respective support dowel 205. Each via 210 can also include a threaded opening adapted to receive a connector, such as a hex bolt or other bolt 215. A bolt 215 can be inserted through an opening in one of the dowels 205 and coupled with the threaded opening in the via 210. Accordingly, the bolt 215 secures the top portion 110-*a* to the bottom portion 110-*b*. In some embodiments, the opening in one or more support dowels 205 is threaded. The support dowels 205 and vias 210 are configured to form an interlocking structure that protects against a shear load applied to the hardened case 110.

The hardened case 110 further includes reinforcement ridges 220 (also seen in FIG. 1). The reinforcement ridges 220 protrude from at least two sides of the hardened case 110. The reinforcement ridges 220 provide load bearing reinforcement to the hardened case 110. In some embodiments, the top portion 110-*a* includes one part of each reinforcement ridge 220, and the bottom portion 110-*b* includes another part of each reinforcement ridge 220. In other embodiments, either the top portion 110-*a* or the bottom portion 110-*b* includes each reinforcement ridge 220.

Different hardened cases 110 can be dimensioned to have different sizes depending upon specified applications. In some embodiments, one example of a hardened case 110 is dimensioned to be 3.1 inches wide, 6.25 inches long, and 1.41 inches high.

Figure 3:
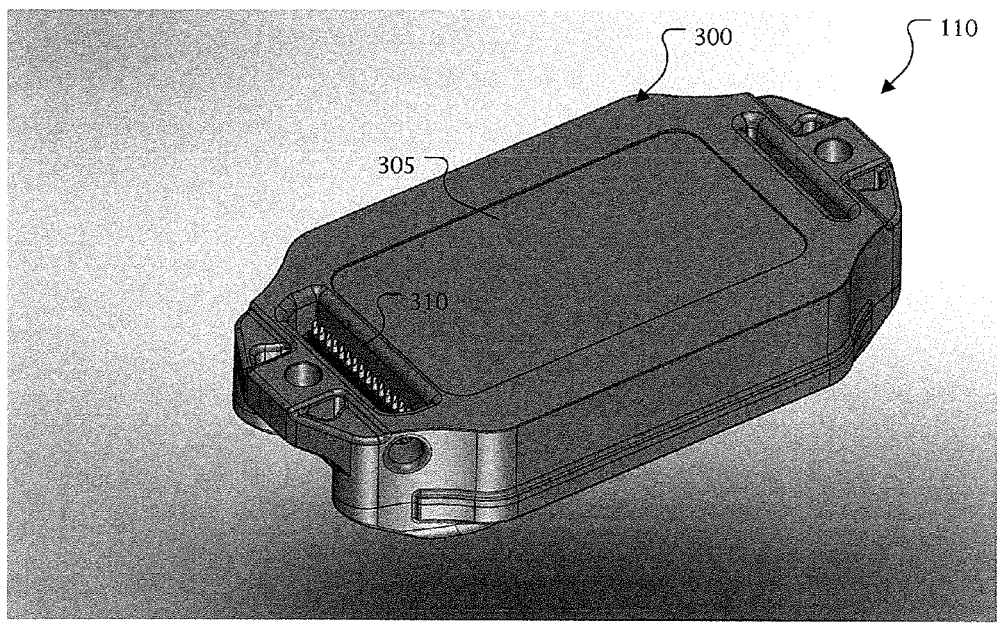
FIG. 3 illustrates an example bottom view of the hardened case according to this disclosure.

FIG. 3 illustrates an example bottom view of the hardened case 110 according to this disclosure. As shown in FIG. 3, the hardened case 110 includes a substantially flat mounting surface 300 (its bottom surface here). In some embodiments, the mounting surface 300 is flat and includes no protrusions or recesses. In other embodiments like the one shown here, the mounting surface 300 includes a recess 305. The recess 305 can be adapted, for example, to receive a mounting mechanism, such as a tape or magnetized source. The mounting surface 300 also includes a fourth window 310, which provides an access point to the control unit 105. For example, the fourth window 310 can be used to upgrade or connect to the control unit 105. The fourth window 310 includes one or more seals for inhibiting the leakage of liquids into the hardened case 110. Note that use of the fourth window 310 can be optional.

Figure 4:
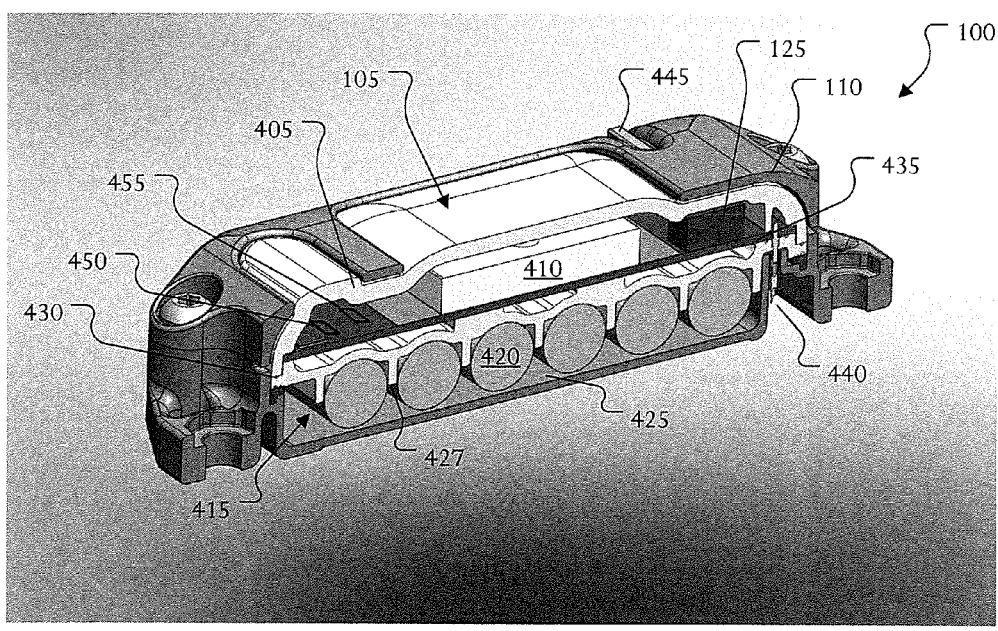
FIG. 4 illustrates an example cross-sectional view of the global tracking device according to this disclosure.

FIG. 4 illustrates an example cross-sectional view of the global tracking device 100 according to this disclosure. As shown in FIG. 4, the GTD 100 includes the control unit 105 protected by the hardened case 110. The control unit 105 here includes a plastic or other encasement 405. The encasement 405 can be molded to conform to an internal shape of the hardened case 110. In some embodiments, the encasement 405 is configured to form a water-tight seal with the internal surfaces of the hardened case 110. The encasement 405 can be a self-contained, sealed compartment that houses processing circuitry 410 and other components of the control unit 105. Accordingly, the combination of the hardened case 110 and the encasement 405 provides two layers of water-tight seals for the GTD 100. In some embodiments, portions of the encasement 405 are configured to extend through one or more windows 115, 120, 130 of the hardened case 110.

The GTD 100 also includes a power source 415, which supplies operating power for the GTD 100. Any suitable power source could be used, such as multiple batteries 420 coupled in series or in parallel. In some embodiments, the power source 415 can include a power converter configured to convert power from an external source for use by the processing circuitry 410 or other components. For example, the power source 415 can include a solar cell converter configured to convert or otherwise redirect electrical power generated by a solar cell into power configured to re-charge the batteries 420 and/or provide power to the processing circuitry 410.

In this example, the batteries 420 are contained within a battery compartment 425. The battery compartment 425 can be formed by a cavity created between the encasement 405 and the bottom portion 110-*b* of the hardened case 110. For example, the battery compartment 425 can be disposed in a region beneath or otherwise adjacent to a location of the processing circuitry 410 within the encasement 405. The encasement 405 can include a plurality of ribs 427 that are configured to define individual battery seats, as well as to inhibit compression of the control unit 105. Upon opening of the hardened case 110 (such as by removing the bottom portion 110-*b*), access to the batteries 420 within the battery compartment 425 can be obtained. Accordingly, one or more batteries 420 can be easily replaced by opening the hardened case 110.

The hardened case 110 further includes one or more seals 430 where different portions of the encasement 405 meet. Among other things, these seals 430 help to seal the battery compartment 425. This can also help to seal battery contacts electrically connecting the processing circuitry 410 to the batteries 420 in order to protect against liquids penetrating the control unit 105.

The processing circuitry 410 here is mounted on a circuit board 435, which is contained within the encasement 405. The circuit board 435 in this example includes an external electrical connection 440. The external electrical connection 440 is electrically coupled to the processing circuitry 410 through one or more connections on the circuit board 435. The external electrical connection 440 is also configured to extend through the fourth window 310. The external electrical connection 440 can be used in various ways, such as to communicate with or power the processing circuitry 410 or to couple to an external device. The junction of the external electrical connection 440 and the encasement 405 is configured to maintain the water-tight seal of the encasement 405. That is, the encasement 405 can be in physical contact with or otherwise molded to the external electrical connection 440 so that liquids cannot enter into the encasement 405 at the junction between the encasement 405 and external electrical connection 440.

The processing circuitry 410 is coupled to the switch 125 through one or more connections on the circuit board 435. The switch 125 can be configured, for example, to toggle the processing circuitry 410 from an on state to an off state and vice-versa. As a particular example, the switch 125 can be configured to interrupt or allow power from the power source 415 to be delivered to the processing circuitry 410. A portion 445 of the switch 125 extends through the third window 130 of the hardened case 110.

In addition, the GTD 100 includes transceivers 450-455 configured to communicate through one or more of the windows 115-120. As noted above, the transceivers 450-455 could support any suitable wireless communication protocol(s). For example, the transceiver 450 could represent a BLE transceiver disposed in proximity to the second window 120, and the transceiver 455 could represent an RFID transceiver also disposed in proximity to the second window 120.

Figure 5:
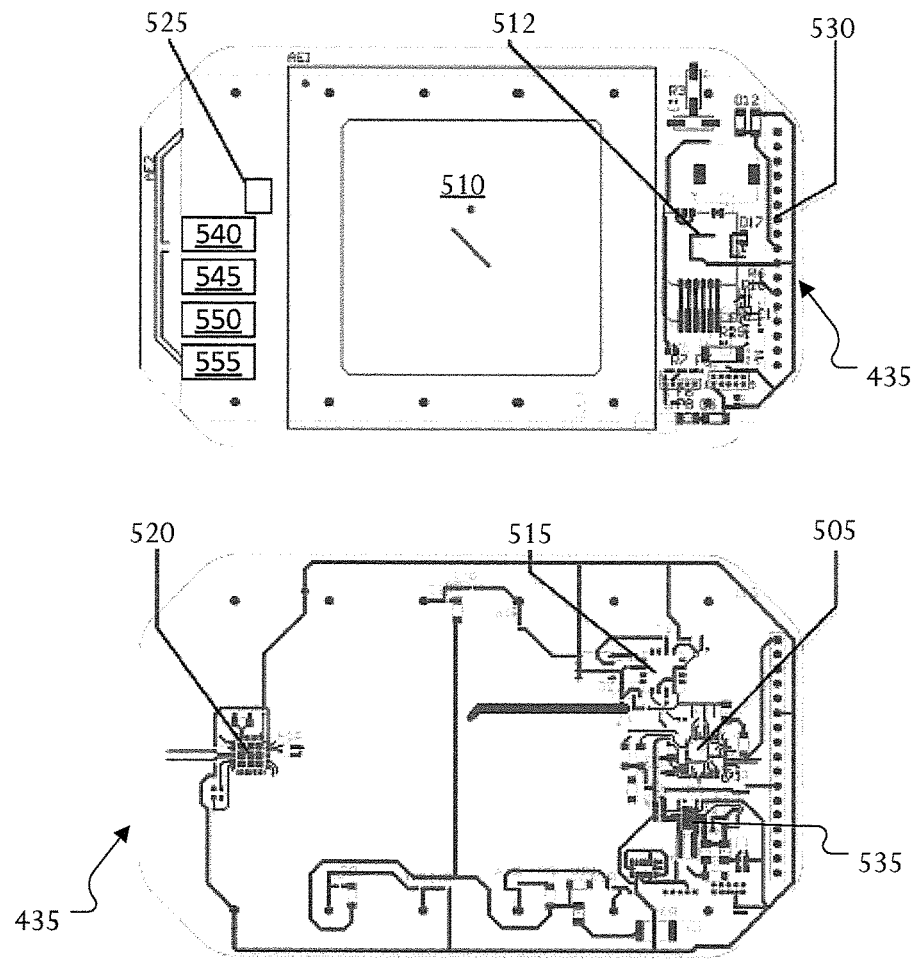
FIG. 5 illustrates an example circuit board in the global tracking device according to this disclosure.

FIG. 5 illustrates an example circuit board 435 in the global tracking device 100 according to this disclosure. As shown in FIG. 5, circuitry is disposed on both sides of the circuit board 435. The circuitry here includes a controller 505 and a long-distance transceiver 510. The transceiver 510 can include an antenna coupled to a modem 512, such as a satellite modem, cellular modem, or other suitable wireless communications modem.

The circuitry also includes a global positioning system (GPS) engine 515, a BLE engine 520, and an RF identifier 525. The RF identifier 525 could be an embedded passive global RFID device. The circuit board 435 further includes various conductive tracings configured to communicatively couple the controller 505 to the transmitter 510, the GPS engine 515, the BLE engine 520 and the RF identifier 525. An expansion header 530 can be coupled to one or more elements on the circuit board 435 through the conductive tracings to provide a connection point for access to the components on the circuit board 435 or for future access. For example, the expansion header 530 can be configured to provide a future use capability for communicating with or powering of the processing circuitry 510 or for coupling to an external device via the external electrical connection 440.

The controller 505 is coupled to a memory 535. The memory 535 is configured to store instructions and data used, generated, or collected by the controller 505. The controller 505 is configured to control the functions of the GTD 100. For example, the controller 505 can be configured to control wireless communications sent and received by the transceiver 510 or the BLE engine 520.

In this example, the circuit board 435 further includes multiple sensors. The sensors can include a shock sensor 540, an accelerometer 545, a temperature sensor 550, and a three-dimensional (3D) impact sensor 555. The controller 505 can use the sensors 540-555 in any suitable manner. For example, the controller 505 could use the sensors to determine if the object to which the GTD 100 is attached has been dropped or damaged. Accordingly, the GTD 100 can be configured to initiate event-based maintenance. For instance, the GTD 100 can trigger an alarm indicating that the object to which the GTD 100 is attached may require maintenance due to an impact occurring over a threshold amount, such as an impact three times the force of gravity (3G) in any direction. Moreover, the GTD 100 can store information related to the impact, such as by storing and providing information related to the shock in x-y-z vectors. Additionally, the controller 505 can be configured to differentiate between impact, motion, and machine vibration (such as vibration from normal operation). The controller 505 can combine information regarding motion and vibration to detect impact and differentiate impact from normal operation. The GTD 100 also can be configured to measure an internal temperature of the GTD 100.

The controller 505 may represent a single processing device, a multi-processing unit, or a distributed processing system. The controller 505 can utilize instructions stored in the memory 535 and connections to various other components, such as various transceivers, sensors, or batteries.

During operation, the controller 505 can store data related to the object to which the GTD 100 is attached in the memory 535. The controller 505 can therefore be configured to perform data logging, such as downloading high-resolution data locally. Additionally, the controller 505 can alter the timing of a report based on motion of the GTD 100, such as movement of the object to which the GTD 100 is attached. The GTD 100 can also store information related to vibration of the object to which the GTD 100 is attached. Accumulated vibration information can include data related to year-to-date, lifetime, and instant operation (this trip) vibrations. The GTD 100 can further measure the vibrations using the sensors and embed vibration information in messages reported to an operator or central facility. In some embodiments, the GTD 100 includes a vibration detection read switch configured to enable an operator to read vibration information via an external device.

The memory 535 may include any suitable volatile and/or non-volatile storage and retrieval device(s). For example, the memory 535 can include any electronic, magnetic, electromagnetic, optical, electro-optical, electro-mechanical, and/or other physical device(s) that can contain, store, communicate, propagate, or transmit information. The memory 535 can store data and instructions for use by the controller 505. Additionally, the memory 535 can store information related to the object to which the GTD 100 is attached, such as detected location, event history, maintenance history, emergency handling procedures, and so forth.

External devices and users can interact with the GTD 100 in any suitable manner. For example, the GTD 100 could communicate with a monitor, keyboard, mouse, or other input/output device. The GTD 100 could also communicate wirelessly with other devices or systems.

Figure 6:
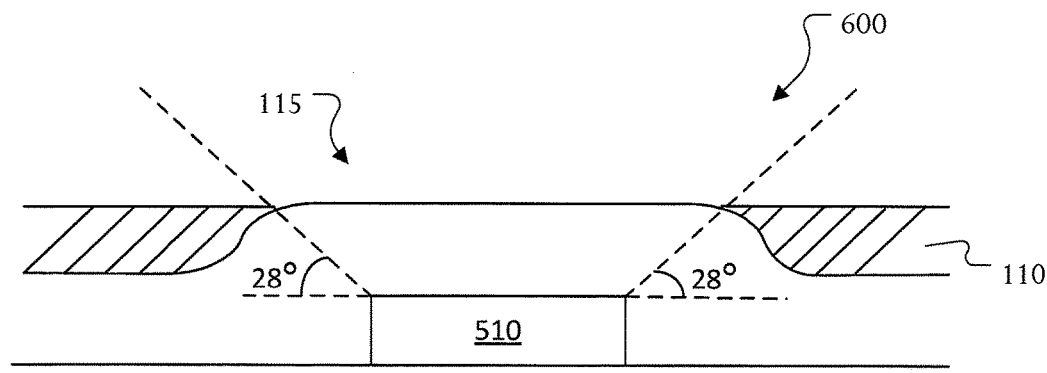
FIG. 6 illustrates an example signal focusing configuration of the global tracking device according to this disclosure.

FIG. 6 illustrates an example signal focusing configuration 600 of the global tracking device 100 according to this disclosure. As shown in FIG. 6, one or more long-range RF signals are focused into the transceiver 510 using this signal focusing configuration.

The signal focusing configuration 600 defines a relationship between a location of the transceiver 510 and edges of the hardened case 110. More specifically, the transceiver 510 is disposed at a location corresponding to the first window 115. For example, the transceiver 510 can be disposed at a location on the circuit board 435 that is centered beneath the first window 115. The transceiver 510 is also disposed such that an angle formed by an adjacent edge of the first window 115, the transceiver 510, and the circuit board 435 focuses RF energy towards the transceiver 510. In some embodiments, the angle formed by an adjacent edge of the first window 115, the transceiver 510, and the circuit board 435 is about 28°. The hardened case 110 therefore focuses RF energy towards the transceiver 510. The exact position of the transceiver 510 may vary as long as the relationship between the transceiver 510 and edges of the first window 115 is maintained.

Figure 7:
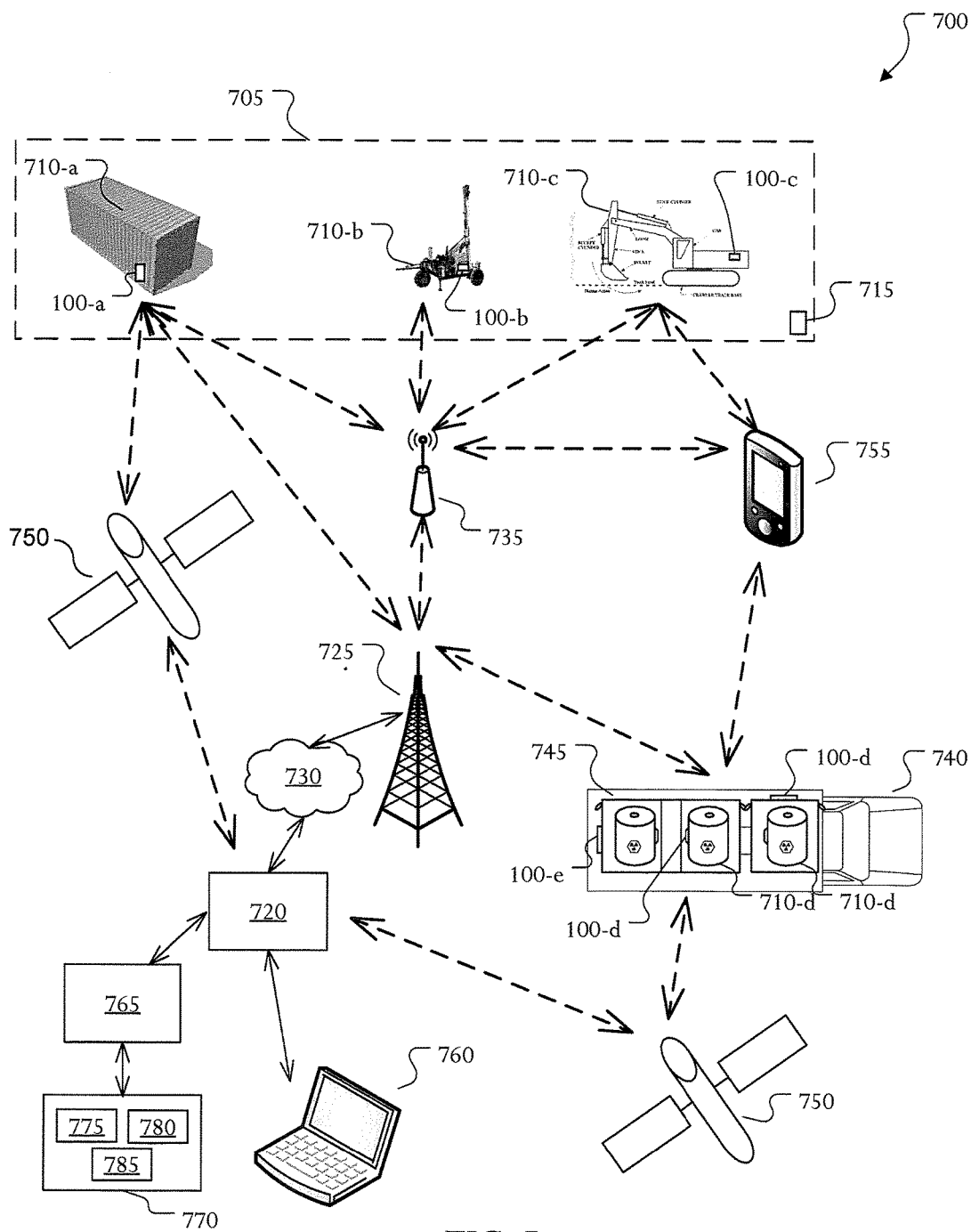
FIG. 7 illustrates an example global tracking and reporting system according to this disclosure.

FIG. 7 illustrates an example global tracking and reporting system 700 according to this disclosure. As shown in FIG. 7, an operation site 705 includes multiple pieces of equipment 710, such as storage containers 710-*a*, machinery 710-*b*, and construction equipment 710-*c*. The operation site 705 can represent any suitable location, such as an excavation site, a drilling site, an industrial facility, a manufacturing site, or the like. The operation site 705 can include any number of pieces of equipment.

Each piece of equipment here includes, is attached to, or is otherwise associated with a GTD 100. For example, a container 710-*a* is associated with a first GTD 100-*a* attached to a sidewall, either internally or externally. Among other things, the first GTD 100-*a* could store information about the container 710-*a* and one or more articles contained within the container 710-*a*. Additionally, the machinery 710-*b* and the construction equipment 710-*c* are associated with a second GTD 100-*b* and a third GTD 100-*c*, respectively. Each of these GTDs 100-*b* and 100-*c* can store information regarding the respective item to which it is attached.

The operation site 705 can optionally include a transponder 715, such as an RFID transponder. The transponder 715 can be configured to transmit a location identifier (ID), read an identifier from an RFID transmitter, or both. The location identifier can include information regarding the operation site 705. For example, the GTD 100-*a* attached to the container 710-*a* can receive a location identifier from the transponder 715 as the GTD 100-*a* enters into communication proximity with the transponder 715. This could occur, for instance, when a transport truck delivers the container 710-*a* to the operation site 705 and the transponder 715 transmits the location identifier to the GTD 100-*a*. This could support local functions within the operation site 705, such as when the operation site 705 supports local RFID tracking. Note, however, that the transponder 715 could be omitted in favor of the on-board location identification functionality of the GTDs.

The GTD 100-*a* can transmit messages to a central facility 720. A message can include an identifier for that GTD and a location of that GTD. A message can also include an object identifier identifying the object to which the GTD is attached. In some embodiments, a message further includes information regarding the contents of a container or other equipment 710. For example, the message may indicate that a specified container 710-*a* is located at a specified location and contains specified equipment and material. If the GTD 100 is configured to do so, the message can also include an identifier uniquely associated with the contents of the container 710-*a*. In some embodiments, when the contents include a radioactive or other hazardous source, the message can include a reading from a radiation sensor or other sensor (in either the container 710-*a* or operation site 705).

The GTDs 100-*b* and 100-*c* can also transmit messages to the central facility 720 about their associated machinery 710-*b* and construction equipment 710-*c*. Additionally, if a GTD is so configured, a message can include an identifier of other co-located GTD-enabled objects nearby.

In some embodiments, messages from the GTDs to the central facility 720 are transmitted using wireless cellular communications via one or more base stations 725 to the central facility 720. A base station 725 can be configured to transmit the messages to the central facility 720 via wireless communications or via a backhaul connection 730.

In other embodiments, messages can also be transmitted to one or more relay stations 735. A relay station 735 may be located at a regional office with a transceiver, or the relay station may be a standalone transceiver with appropriate logic necessary to transmit the messages.

In yet other embodiments, a vehicle 740 can transport equipment or materials, such as in one or more containers 710-*d*. The vehicle 740 could represent a truck, railcar, ship, plane, or other vehicle. The containers 710-*d* on the vehicle 740 are housed in an overpack 745, such as when the containers 710-*d* contain a radioactive material. The containers 710-*d* include a number of articles with corresponding information, such as IDs, stored in the memory of the attached GTDs 100-*d*. In some embodiments, the GTDs 100-*d* on the containers 710-*d* transmit messages to the central facility 720 via one or more satellites 750. The overpack 745 can also transmit an overpack message, which includes information received from the GTDs 100-*d* attached to the containers 710-*d*, to the central facility 720 via the satellite(s) 750 using its own GTD 100-*e*. A transceiver on the vehicle 740 can further transmit messages or overpack messages to the central facility via the satellite(s) 750. Note, however, that the messages from the vehicle 740 can be sent in other ways, such as via the base station(s) 725 or relay station(s) 735.

In FIG. 7, at least one portable external device 755 is configured to communicate with various GTDs. The external device 755 can be any type of portable device adapted to transmit data to and receive data from one or more GTDs. The external device 755 could, for example, represent a cellular phone, a smartphone, a personal digital assistance, or a laptop computer.

In some embodiments, the external device 755 is adapted to query a GTD to obtain information about the object to which the GTD is attached, such as containers 710-*a* or 710-*d*, machinery 710-*b*, or construction equipment 710-*c*. The external device 755 can also be adapted to program the GTD. For example, the external device 755 can be configured to allow a user to establish a periodic interval for reporting, upload or download maintenance history and comments, and upload or download emergency handling procedures.

The central facility 720 is configured to receive messages and overpack messages from the GTDs and other components at multiple locations. The central facility 720 can also be adapted to track the locations of each GTD, and as such the object to which each GTD 100 is attached, in a database. The central facility 720 can further be configured to report the locations, movement, and histories of each piece of equipment via a user interface 760, such as a computer terminal or website.

In some embodiments, the central facility 720 can generate information data records regarding the locations, movement, and histories of the equipment. For example, the central facility 720 can support a website located on a global communication network (GCN) (such as the web). The website can include the information data records. Accordingly, one or multiple users can be provided access to the location, movement, and history of each piece of equipment. In some embodiments, the website includes a graphical representation of the locations of the pieces of equipment 710. Also, in some embodiments, the website is configured to allow users to interact with the graphical representations. For example, a user may be able to select an icon representing a particular piece of equipment, and in response the website displays information corresponding to the selected equipment.

In some embodiments, the central facility 720 is also configured to send email notifications to multiple users. For example, the central facility 720 can be configured to send the notifications in response to an "alert" event occurring, at periodic intervals, or both. As a particular example, if a container experiences a collision as reported by its GTD 100 and/or is moved (transported), the central facility 720 can send an email alert to a predetermined list of users informing them that the equipment is being moved and/or may be damaged.

As described in more detail below, the GTDs 100 support the association of cargo carriers on which the GTDs 100 are mounted with the cargo being carried by those cargo carriers. For example, in some embodiments, a GTD 100 could receive wireless signals (such as RFID or BLE signals) from cargo when the cargo is placed onto or into a cargo carrier. The GTD 100 could then transmit information identifying the cargo carrier and its cargo, such as to the central facility 720 or a local portable device 755. Note that in the discussion below, for clarity the cargo may be referred to as carried assets and the cargo carriers may be referred to as "baskets" (which are themselves assets).

The information collected from the GTDs 100 could be used in any suitable manner. For example, the information could be stored in a database 765, which represents any suitable data storage and retrieval device(s). From there, a server 770 could make the information available over a network, such as a private or public data network like the Internet. As a particular example, the server 770 could represent a web server that generates and provides a website located on a GCN as described above. The server 770 represents any suitable computing device providing access to the information collected by GTDs 100 or to data based on the information collected by GTDs 100. The server 770 could, for example, represent a computing device having one or more processing devices 775 for executing instructions and processing data. At least one memory 780 stores data and instructions used, generated, or collected by the server 770. At least one network interface 785 supports communications over one or more networks, such as over a wired or wireless network.

Although various features have been shown in FIGS. 1 through 7 and described above, various changes may be made to these figures. For example, the size, shape, arrangement, and layout of components shown in FIGS. 1 through 6 are for illustration only. Each component could have any suitable size, shape, and dimensions, and multiple components could have any suitable arrangement and layout. Also, various components in FIGS. 1 through 7 could be combined, further subdivided, or omitted and additional components could be added according to particular needs. For instance, a system using GTDs could support only cellular or satellite communications. Further, each component in a device or system could be implemented using any suitable structure(s) for performing the described function(s).

As noted above, a GTD 100 can include one or more short-range transceivers, such as the transceivers 450-455. In some embodiments, at least one transceiver in the GTD 100 receives wireless signals from RFID tags, BLE tags, or other trackers associated with carried assets that are in or on a cargo carrier. The GTD 100 could associate the carried assets with the cargo carrier and transmit signals using its long-range transceivers, such as the transceiver 510. In other embodiments, the RF identifier 525 in a GTD 100 could be scanned by a mobile device, such as a portable external device 755. The scanning can involve the GTD 100 transmitting its own identifier, such as an RFID identifier, using a short-range transceiver. The mobile device can then scan one or more trackers or other identifiers (such as optical codes) on the carried assets to associate the GTD 100 or its associated cargo carrier with the carried assets, and a user can indicate whether a carried asset is added to or removed from the cargo carrier. This information can then be transmitted by the portable device 755, such as via WiFi, cellular, or satellite communications. The transmitted information can be received at any suitable destination, such as the central facility 720. The data can then be stored and made available to users, such as via a web-based graphical user interface. This allows the users to identify both the cargo carriers and the carried assets on those cargo carriers.

Figure 8:
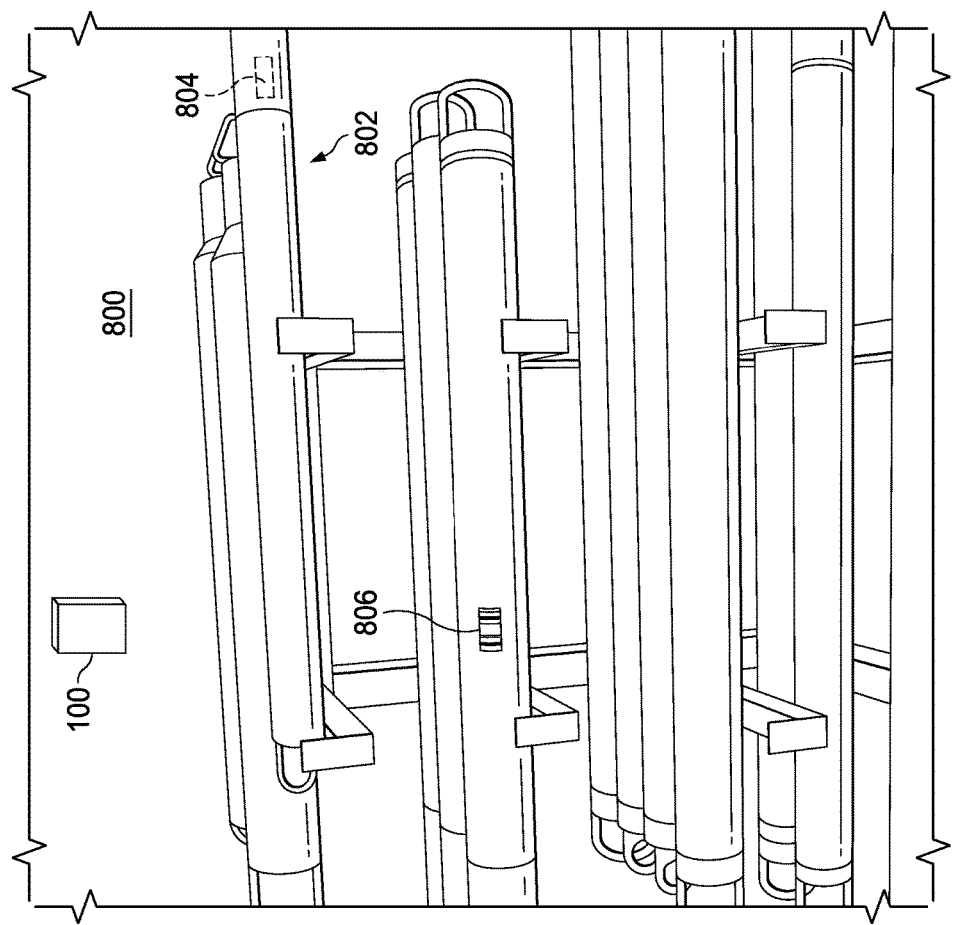
FIG. 8 illustrates an example cargo carrier with integrated location tracking and identification of cargo carrier contents according to this disclosure.

FIG. 8 illustrates an example cargo carrier 800 with integrated location tracking and identification of cargo carrier contents according to this disclosure. As shown in FIG. 8, the cargo carrier 800 represents a container structure storing or carrying various tracked assets 802. In this example, the tracked assets 802 represent downhole assets used in the oil and gas industry. Note, however, that any other suitable cargo carrier could be used, and any other or additional tracked assets could be placed in or on the cargo carrier. As noted above, an asset carrying or otherwise containing other assets may be referred to as a "basket."

As can be seen in FIG. 8, a GTD 100 has been mounted on the cargo carrier 800. The GTD 100 can be mounted at any suitable position inside or outside a cargo carrier 800. Also, one or more assets 802 in this example are each attached to or otherwise associated with a tracking tag 804 or an optical code 806. The tracking tag 804 stores information identifying a tracked asset 802, such as a serial number or other identifier that can be uniquely associated with the tracked asset 802. Similarly, the optical code 806 is encoded with a unique identifier associated with a tracked asset 802.

In some embodiments, a tracking tag 804 provides its stored information to the GTD 100, which can associate the tracked asset's information with the cargo carrier 800 and provide that information to an external destination. In this way, the GTD 100 provides both location tracking and the identification of cargo carrier contents in an integrated device.

In other embodiments, the GTD 100 and a tracking tag 804 or optical code 806 provides information to the portable device 755 or other mobile device, which can associate the tracked asset's information with the GTD's information and provide that information to an external destination. In these embodiments, the GTD 100 or the mobile device could provide location tracking information to the central facility 720. Again, however, the GTD 100 is supporting both location tracking and the identification of cargo carrier contents.

The cargo carrier 800 represents any suitable structure for storing or carrying cargo, such as a pallet, tank, box, or other carrier. The tracked assets 802 represent any suitable assets that can be tracked by one or more location tracking devices. Each tracking tag 804 includes any suitable structure for identifying a tracked asset. For example, a tracking tag 804 could represent a passive device (such as a passive RFID device) that provides information when powered or interrogated by an external device (such as the GTD 100). Other types of tracking tags 804 could also be used, such as active RFID tags. In addition, any suitable optical encoding can be used in the optical code 806, such as a barcode or a Quick Response (QR) optical code.

Although FIG. 8 illustrates one example of a cargo carrier 800 with integrated location tracking and identification of cargo carrier contents, various changes may be made to FIG. 8. For example, any suitable cargo carrier 800 could be used, and any suitable number and type of tracked assets 802 could be stored or carried by the cargo carrier.

Figure 9:
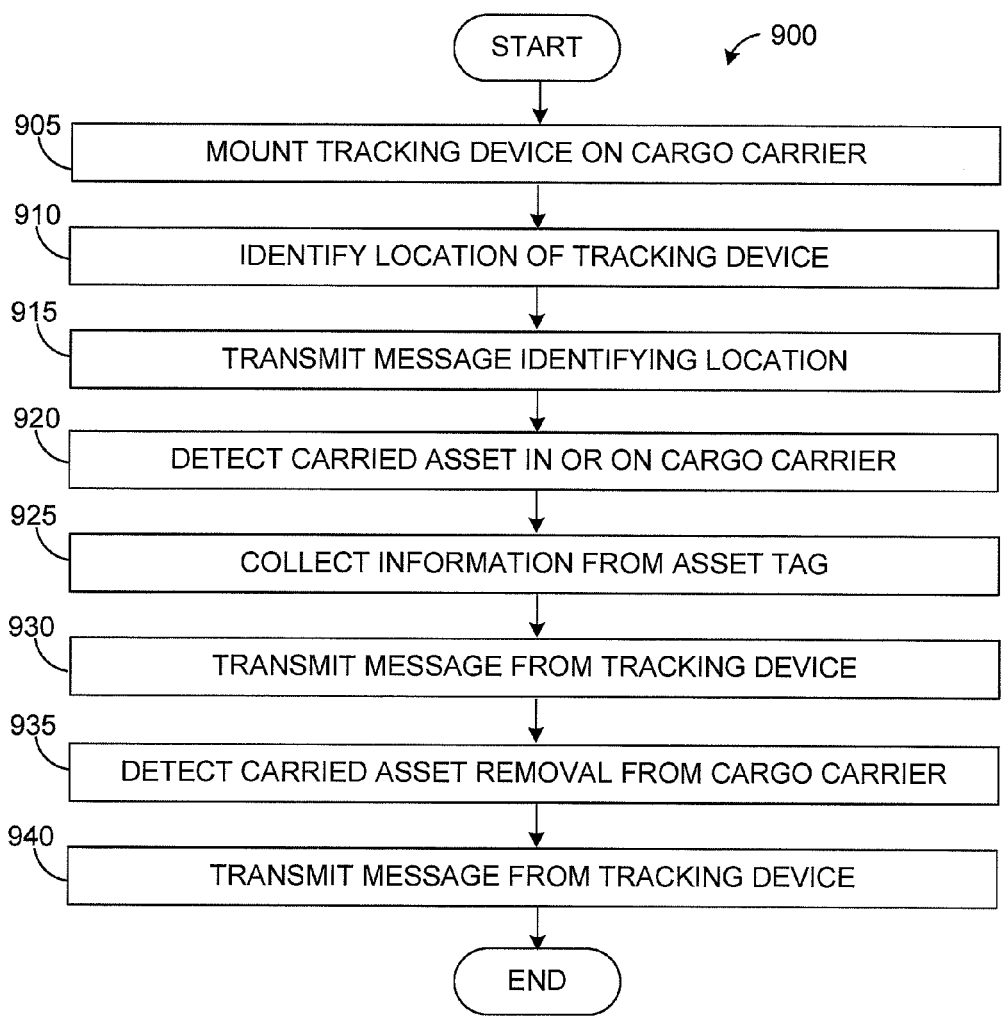
FIGS. 9 through 11 illustrate example methods for location tracking with integrated identification of cargo carrier contents according to this disclosure.
Figure 10:
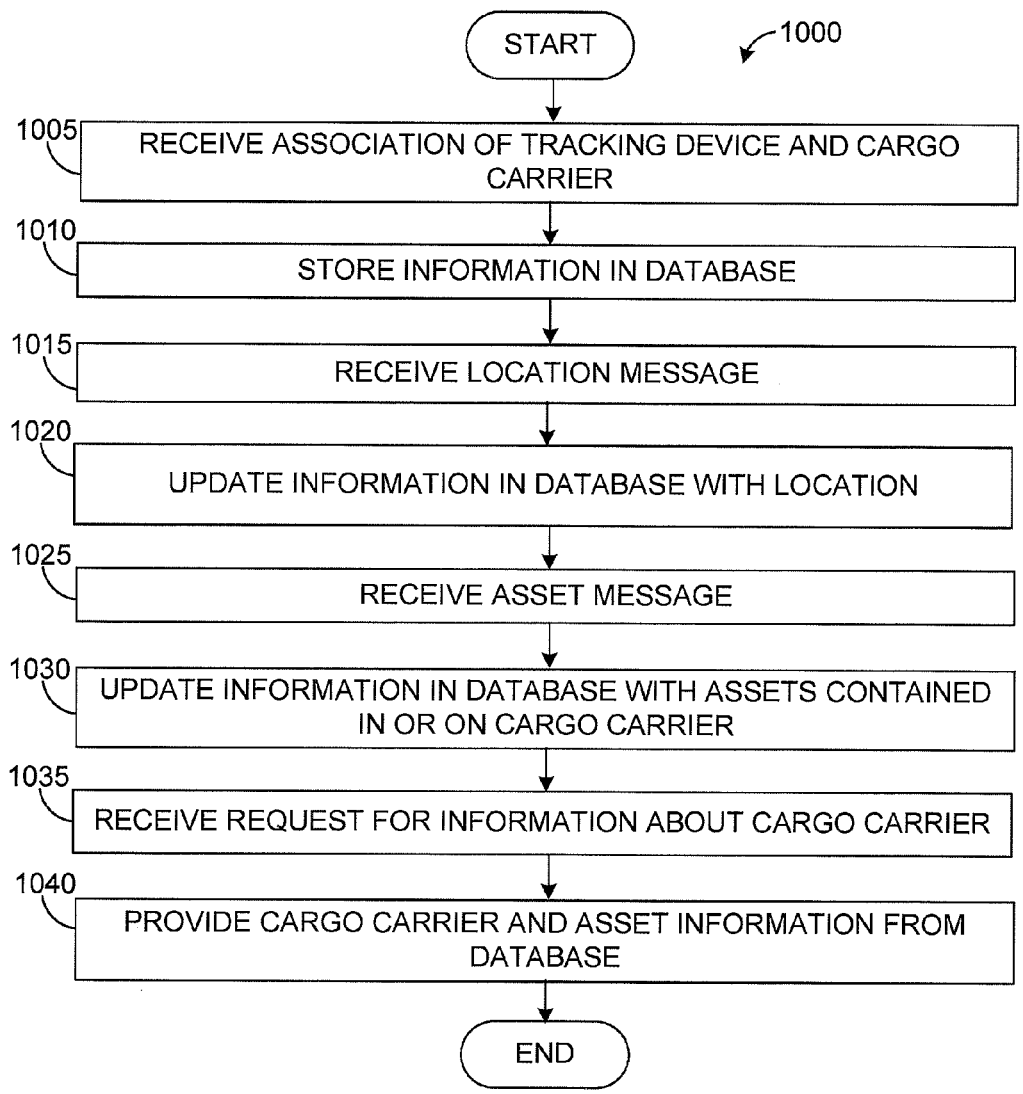
Figure 11:
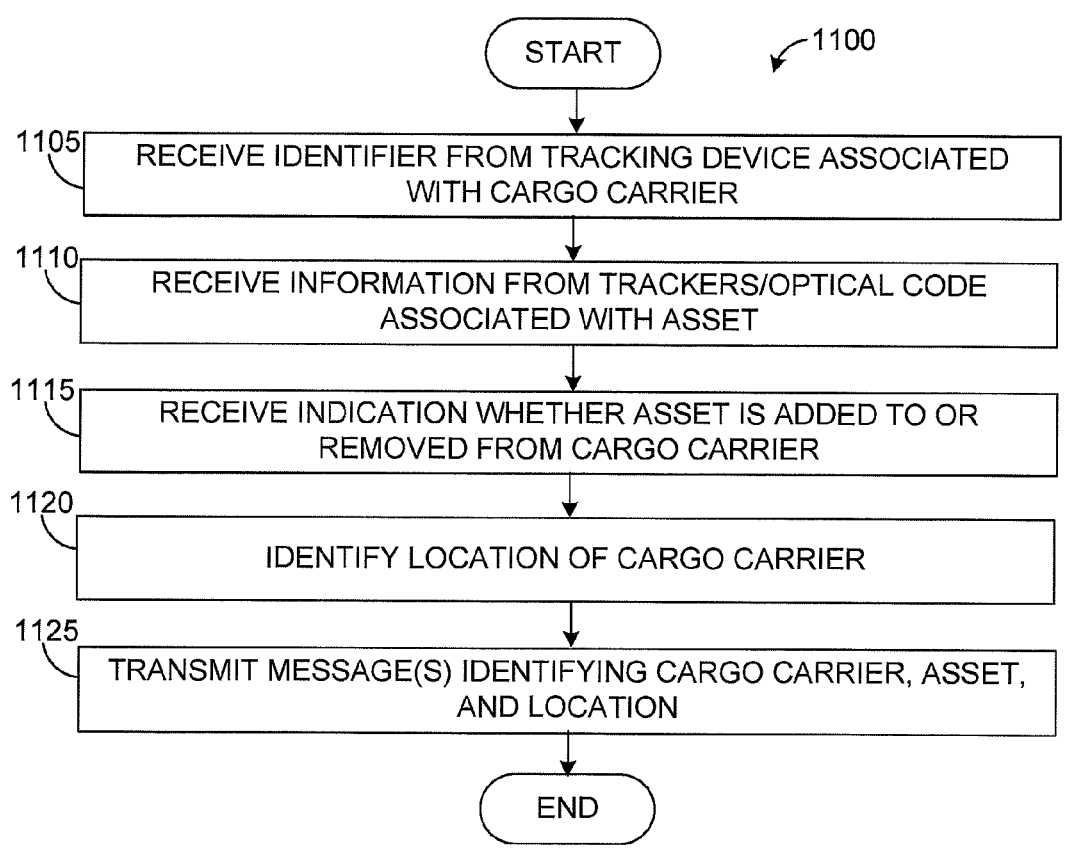

FIGS. 9 through 11 illustrate example methods for location tracking with integrated identification of cargo carrier contents according to this disclosure. In particular, FIG. 9 illustrates a method 900 that can be performed using a tracking device (such as the GTD 100), and FIG. 10 illustrates a method 1000 that can be performed using a data collector (such as the server 770). Also, FIG. 11 illustrates a method 1100 that can be performed using a portable mobile device (such as the device 755).

As shown in FIG. 9, the method 900 includes mounting a tracking device on a cargo carrier at step 905. This could include, for example, mounting a GTD 100 inside or outside of a cargo carrier. This could optionally include programming the GTD 100 with information about the cargo carrier. This could further include updating a data record associated with the cargo carrier with the device identifier of the GTD 100 or updating a data record associated with the GTD 100 with an identifier of the cargo carrier. The data update could be done locally (such as using the portable device 755) or remotely (such as at the remote facility 720).

The tracking device identifies its location at step 910 and transmits a message identifying its location at step 915. This could include, for example, the control unit 105 identifying the location of the GTD 100 using the GPS engine 515. The control unit 105 could then generate a message containing its device identifier, current location, and any other suitable information for transmission over a WiFi, cellular, or satellite network.

A carried asset is detected in or on the cargo carrier at step 920. This could include, for example, the GTD 100 polling for any contents of the cargo carrier to determine if any RFID, BLE, or other tags respond. This could also include the GTD 100 receiving a signal indicating that cargo has been added to the cargo carrier. Information from the carried asset's tag is collected at step 925. This could include, for example, the control unit 105 identifying a unique serial number or other identifier associated with the asset tag. Note that steps 920-925 could be combined, such as when the detection of the carried asset includes receiving an RFID, BLE, or other signal that also identifies the carried asset. A message is transmitted from the tracking device at step 930. This could include, for example, the control unit 105 generating a message for transmission over a WiFi, cellular, or satellite network. The message can include an identification of the GTD 100, as well as an identification of the carried asset(s) present in or on the cargo carrier.

Removal of a carried asset from the cargo carrier is detected at step 935. This could include, for example, the GTD 100 determining that a passive asset tag previously in or on the cargo carrier is now failing to respond to polling messages. This could also include the GTD 100 determining that an active asset tag is no longer transmitting data to the GTD 100. A message is then transmitted at step 940. This could include, for example, the control unit 105 generating a message for transmission over a WiFi, cellular, or satellite network. The message can include an identification of the GTD 100, as well as an identification of the carried asset(s)

present in or on the cargo carrier or an identification of the carried asset(s) removed from the cargo carrier.

As shown in FIG. 10, the method 1000 includes receiving an association of a tracking device and a cargo carrier at step 1005, and the information is stored in a database at step 1010. This could include, for example, receiving information indicating that a particular GTD 100 has been mounted to a particular cargo carrier. Any suitable information about the GTD 100 or cargo carrier could be received here, such as a device identifier for the GTD 100 and a name, description, or identifier of the cargo carrier. This information can be provided from any suitable source, such as a portable external device 755. This information can also be received at any suitable destination, such as the central facility 720. The information can further be stored in any suitable manner, such as by creating a record in the database 765 to associate the GTD 100 and the cargo carrier.

A location message is received at step 1015, and the information is stored in the database at step 1020. This could include, for example, receiving a location update message from the GTD 100 mounted to the cargo carrier. The GTD 100 could report its position at any suitable periodic or non-periodic interval(s). The location information can be stored in the database as the location of the GTD 100 or the location of the cargo carrier. As noted above, the location information could be received from other sources, such as the portable device 755.

An asset message is received at step 1025, and the information is stored in the database at step 1040. The asset message could represent a message indicating that a carried asset has been placed onto or into the cargo carrier or removed from the cargo carrier. The asset message could include any suitable information, such as a unique identifier identifying the carried asset, an indication whether the carried asset was added or removed, and a timestamp identifying when the addition or removal of the carried asset was detected by the GTD 100. As noted above, information about the asset could originate from other sources, such as the portable device 755.

A request for information about the cargo carrier is received at step 1035. This could include, for example, the server 770 receiving a request for information about the cargo carrier through a website. The information about both the cargo carrier and its carried assets is retrieved from the database and provided to the user at step 1040. This could include, for example, generating a web page showing information about the cargo carrier as well as information about the carried assets currently in or on the cargo carrier. The web page could also include information about what assets were previously in or on the cargo carrier and have been removed.

As shown in FIG. 11, the method 1100 provides an alternate way in which information associating a GTD or a cargo carrier with the cargo carrier's carried assets is disclosed. As shown here, an identifier is received from a tracking device associated with a cargo carrier at step 1105. This could include, for example, a portable device 755 receiving an RFID, BLE, or other identifier from a GTD 100 mounted in or on a cargo carrier. As a particular example, this could be done in response to a user initiating a scan of the GTD 100 with the portable device 755.

When an asset is added to or removed from the cargo carrier, information from a tracker or optical code associated with that asset is received at step 1110. This could include, for example, the portable device 755 scanning a passive tag 804 or an optical code 806 on the asset. An indication of whether the asset is being added to or removed from the cargo carrier is received at step 1115. This can be done, for example, by presenting add or remove options on a display screen of the portable device 755 and receiving a selection from the user.

The location of the cargo carrier is identified at step 1120. This could include, for example, the GTD 100 or the portable device 755 identifying its location. One or more messages are transmitted at step 1125. This could include, for example, the portable device 755 transmitting a message identifying the cargo carrier, the asset, and whether the asset was placed in or removed from the cargo carrier. This could also include the GTD 100 and/or the portable device 755 transmitting a message identifying the location of the GTD 100 and/or the portable device 755. If transmitted from the portable device 755, a single message or multiple messages could be transmitted. The central facility 720 or other destination receiving the message(s) could then use the information in any suitable manner, including as shown in FIG. 10, to associate the location with the carried asset. Note that when the portable device 755 identifies the location of the cargo carrier, the tracking device on the cargo carrier may (but need not) be replaced by an identification device, such as a passive RFID tag or other identifier on the cargo carrier, that merely identifies the cargo carrier rather than tracking a location of the cargo carrier.

Although FIGS. 9 through 11 illustrate examples of methods for location tracking with integrated identification of cargo carrier contents, various changes may be made to FIGS. 9 through 11. For example, while shown as a series of steps, the steps in each figure could overlap, occur in parallel, occur in a different order, or occur any number of times. As a particular example, the GTD 100 could repeat steps 910-915 at a specified interval, while steps 920-940 are performed only when the addition or removal of a carried asset is detected.

Figure 12:
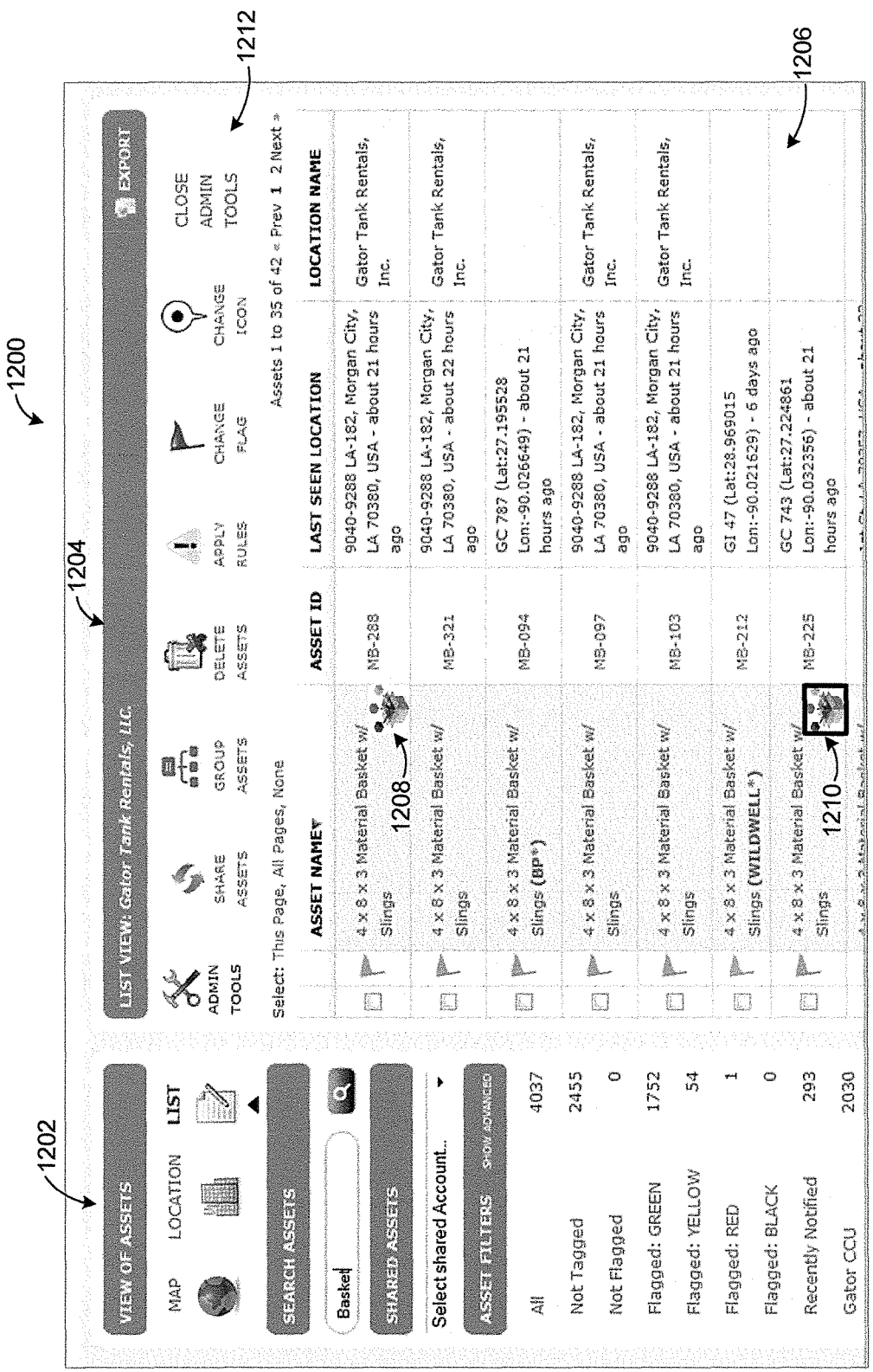

FIGS. 12 through 14 illustrate example graphical user interfaces showing integrated location tracking and identification of cargo carrier contents according to this disclosure. The graphical user interfaces could, for example, be generated by the server 770 using data stored in the database 765.

As shown in FIG. 12, a graphical user interface 1200 allows a user to locate assets and select those assets for more information. In this example, the graphical user interface 1200 includes an asset selection area 1202, which allows a user to locate and select different assets. Here, the user can choose to view assets either on a map, by location, or in a list. The user can also search for assets, such as by entering one or more keywords related to one or more assets' names or descriptions. The user could further select shared assets (assets owned by more than one individual or organization) by account using a drop-down menu. In addition, the user can use various filters to search for assets.

A view area 1204 provides the user with information about the asset or assets located during the user's search. In this example, for instance, the view area 1204 provides information identifying various assets associated with the keyword "basket." Each located asset is included in a row 1206 in the view area 1204. Each row 1206 identifies an asset's name, identifier, and last-known location and time.

If an asset listed in the view area 1204 has contents associated with it, an icon 1208 is presented in the row 1206 for that asset. The icon 1208 indicates that the asset listed in the view area 1204 itself contains other assets that can be tracked. In other words, the icon 1208 is used to identify whether a listed asset is a cargo carrier. As described below, the icon 1208 can be selected to view the contents of the cargo carrier.

Note that when searching for assets such as by keyword, the system can allow matches to the asset name itself or to the contents of an asset. For example, a search for the term "basket" could identify all assets with the term "basket" in their names, as well as any cargo carriers having carried assets with the term "basket" in the names. When a cargo carrier has a carried asset that matches search criteria provided by a user, an indicator can be used to identify that this has occurred. In FIG. 12, for example, a line 1210 can be placed around an icon 1208, indicating that a cargo carrier associated with that icon 1208 contains a carried asset that matches the user's search criteria.

A toolbar 1212 provides access to various functions, at least some of which are related to the assets identified in the view area 1204. For example, some controls in the toolbar 1208 allow the user to identify various assets as shared assets, group assets together into groups, or delete assets. Another command allows the user to apply certain rules to selected assets, such as rules related to movement of the assets. Yet another command allows the user to change the flag or icon associated with an asset.

FIG. 13 illustrates the graphical user interface 1200 after the user has placed a cursor over an icon 1208 in the display. When this occurs, a pop-up window 1302 can appear identifying the contents of the cargo carrier associated with that icon 1208. In this example, the pop-up window 1302 identifies various information about any carried assets associated with the selected icon 1208, such as each asset's owner, description, and identifier. The information can also include rental information, such as rental start day and remaining rental days.

FIG. 14 illustrates an example graphical user interface 1400 presenting information related to a single "basket" or cargo carrier. The graphical user interface 1400 can be presented, for example, when the user selects one of the assets from the view area 1204 in the graphical user interface 1200.

As shown in FIG. 14, the graphical user interface 1400 includes a bar identifying the name of the basket or other asset. Description information 1404 provides a brief description of the asset, and location information 1406 provides information about the last-known location of the asset.

Basket contents 1408 identify the contents of a cargo carrier (assuming the asset identified in areas 1402-1406 is a cargo carrier). Here, the basket contents 1408 include the same information provided in the pop-up window 1302. Note, however, that more detailed information could be provided in the basket contents 1408 since there is more display room in this example. Also note that hyperlinks could be associated with the listed carried assets, enabling a user to obtain more information about each carried asset.

In addition, compliance information 1410 provides compliance-related information about the basket or the carried assets in the basket. The compliance information 1410 can include information such as compliance tasks that have been or are to be performed. If completed, the compliance information 1410 can include the name of the person that performed a task, the date of the task's completion, and the length of time that the task results are valid. Further, the next due date for a compliance task could be identified and color-coded or otherwise marked. In addition, links can be provided for viewing documentation or other information about the compliance tasks.

Using the graphical user interfaces shown here, a user is able to quickly identify carried assets that are contained within cargo carriers. Moreover, the user is able to view information about those carried assets in a logical and convenient manner.

Although FIGS. 12 through 14 illustrate examples of graphical user interfaces showing integrated location tracking and identification of cargo carrier contents, various changes may be made to FIGS. 12 through 14. For example, the content and arrangement of the information in FIGS. 12 through 14 are for illustration only. Other graphical user interfaces could present information about baskets and their contents in any other suitable manner. Also, while certain indicators are described here (such as large lines or color-coded shadings), any other suitable indicators could be used.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving, at a portable device associated with a user, an identification of a cargo carrier from an identification device associated with the cargo carrier;
identifying, at the portable device, an asset being added to or removed from the cargo carrier;
generating, at the portable device, one or more messages identifying the cargo carrier, and the asset and indicating whether the asset is being added to or removed from the cargo carrier;
transmitting, from the portable device, the one or more messages; and
displaying, on a first display interface, the one or more messages and, on a second display interface, a compliance task associated with at least one of the cargo carrier and the asset,
wherein the displaying on the second display interface further comprises displaying links to documentation describing the compliance task.

2. The method of claim 1, further comprising:
identifying, at the portable device, a location of the portable device;
wherein the one or more messages further include the location of the portable device.

3. The method of claim 1, wherein:
the identification device associated with the cargo carrier comprises a tracking device; and
the method further comprises transmitting, from the tracking device, a message identifying a location of the cargo carrier.

4. The method of claim 1, wherein identifying the asset comprises one of:
receiving information identifying the asset from a tracking tag associated with the asset; and
scanning an optical code on the asset using the portable device.

5. The method of claim 1, further comprising:
receiving from the user an indication whether the asset is being added to or removed from the cargo carrier.

6. The method of claim 1, wherein the portable device comprises at least one of: a cellular telephone, a smartphone, a personal digital assistance, and a laptop computer.

7. A method comprising:
receiving, at a location tracking device, an association of the location tracking device with a cargo carrier;
identifying, at the location tracking device associated with the cargo carrier, a location of the location tracking device;
transmitting polling messages, by the location tracking device, into the cargo carrier to determine whether the cargo carrier includes one or more assets;
receiving, at the location tracking device, information identifying one or more carried assets in or on the cargo carrier;
generating, at the location tracking device, one or more messages identifying the location of the location tracking device and the one or more carried assets in or on the cargo carrier; transmitting, from the location tracking device, the one or more messages; and
displaying, on a first display interface, the one or more messages and, on a second display interface, a compliance task and a link to documentation describing the compliance task, the compliance task associated with at least one of the cargo carrier and the one or more assets.

8. The method of claim 7, wherein:
identifying the location of the location tracking device comprises using global positioning system (GPS) signals; and
receiving the information identifying the one or more carried assets comprises receiving signals from one or more tracking tags associated with the one or more carried assets.

9. The method of claim 7, further comprising:
detecting removal of at least one of the one or more carried assets from the cargo carrier; and
generating a message identifying the removal of the at least one carried asset.

10. The method of claim 9, wherein the message identifying the removal of the at least one carried asset comprises one of:
a message identifying any remaining carried assets in or on the cargo carrier; and
a message identifying the at least one removed carried asset.

11. A method comprising:
receiving information associating a tracking device with a cargo carrier;
receiving information identifying a location associated with the cargo carrier;
receiving information identifying one or more carried assets in or on the cargo carrier;
storing the information identifying the location of the cargo carrier in association with the information identifying the one or more carried assets in or on the cargo carrier;
updating the location of the cargo carrier to track the location of the one or more carried assets;
displaying a compliance task associated with at least one of the cargo carrier and the one or more carried assets;
generating a first graphical user interface identifying multiple assets including the cargo carrier;
displaying an icon in association with the cargo carrier in the first graphical user interface, the icon indicating that the cargo carrier contains the one or more carried assets; receiving one or more asset search criteria from a user;
identifying assets that satisfy the one or more asset search criteria; and
if the cargo carrier satisfies the one or more asset search criteria because of the one or more carried assets, modifying the icon associated with the cargo carrier.

12. The method of claim 11, further comprising:
displaying a list of the one or more carried assets in response to a user's selection of the icon.

13. The method of claim 11, further comprising:
generating a second graphical user interface in response to a user's selection of the cargo carrier in the first graphical user interface, the second graphical user interface comprising a list of the one or more carried assets.

14. The method of claim 13, wherein the second graphical user interface further comprises a description and a last-known location of the cargo carrier.

15. The method of claim 13, wherein the compliance task is displayed by the second graphical user interface.

16. The method of claim 15, wherein the second graphical user interface further comprises links to documentation describing the compliance task.

17. The method of claim 11, further comprising:
receiving an indication that at least one of the one or more carried assets has been removed from the cargo carrier; and
removing the at least one carried asset from its association with the cargo carrier.

18. The method of claim 11, wherein receiving the information identifying the location of the cargo carrier and receiving the information identifying the one or more carried assets comprises receiving the information from at least one of: a location tracking device mounted to the cargo carrier and a portable device used by a user in proximity to the cargo carrier.

19. A method comprising:
removably coupling a location tracking device on a cargo carrier by removably affixing the location tracking device to the cargo carrier by one or more mounting mechanisms;
associating the location tracking device with the cargo carrier;
receiving, at a portable device associated with a user, an identification of the cargo carrier from the location tracking device associated with the cargo carrier;
determining, by the location tracking device, whether one or more assets have been added to or removed from the cargo carrier;
generating one or more messages identifying the cargo carrier and the one or more assets and indicating whether the one or more assets is being added to or removed from the cargo carrier;
transmitting, the one or more messages to a remote server;
receiving, at the remote server or the portable device, one or more asset search criteria from a user;
identifying, by the remote server or portable device, assets that satisfy the one or more asset search criteria; and if the cargo carrier satisfies the one or more asset search criteria because of the one or more carried assets, modifying an icon associated with the cargo carrier, wherein the icon is displayed on a display of the remote server or a display of the portable device.

20. The method of claim 19, generating one or more messages comprises indicating a time that the one or more assets was added or removed.

* * * * *